No. 721,107. PATENTED FEB. 17, 1903.
T. G. STEVENS.
SPRING FOR VEHICLES.
APPLICATION FILED JULY 21, 1902.
NO MODEL. 2 SHEETS—SHEET 1.

WITNESSES.
Samuel Percival
Herbert C. Bolwell

INVENTOR.
Thomas George Stevens
By his Attorneys.
Wheatly & MacKenzie

No. 721,107. PATENTED FEB. 17, 1903.
T. G. STEVENS.
SPRING FOR VEHICLES.
APPLICATION FILED JULY 21, 1902.

NO MODEL. 2 SHEETS—SHEET 2.

WITNESSES. INVENTOR.
Thomas George Stevens
By his Attorneys.

UNITED STATES PATENT OFFICE.

THOMAS GEORGE STEVENS, OF GRAVESEND, ENGLAND.

SPRING FOR VEHICLES.

SPECIFICATION forming part of Letters Patent No. 721,107, dated February 17, 1903.

Application filed July 21, 1902. Serial No. 116,408. (No model.)

*To all whom it may concern:*

Be it known that I, THOMAS GEORGE STEVENS, a subject of the King of Great Britain and Ireland, whose post-office address is Swiss Cottage, Rosherville, Gravesend, in the county of Kent, England, have invented certain new and useful Improvements in and Connected with Springs for Vehicles; and I do hereby declare the following to be a full, clear, and exact description of the invention, such as will enable others skilled in the art to which it appertains to make and use the same.

This invention for improvements in and connected with springs for vehicles has for its object to provide springs arranged and constructed in a simple and effective manner suitable for carriages, railway-wagons, and the like vehicles and which by the provision of a simple means may be caused to indicate the weight of their contents; and it consists, essentially, of toggle-levers connected together and to a spring or springs in such a manner that each pair of levers may be acted on by a separate spring or springs, or one spring or set of springs may act on several toggles in common and so that all the said toggles are actuated in unison. By this means and by the addition of a pointer attached to a moving part of the toggle system and working over a properly-graduated scale the weight of the load in the vehicle may be read off.

Figure 1:
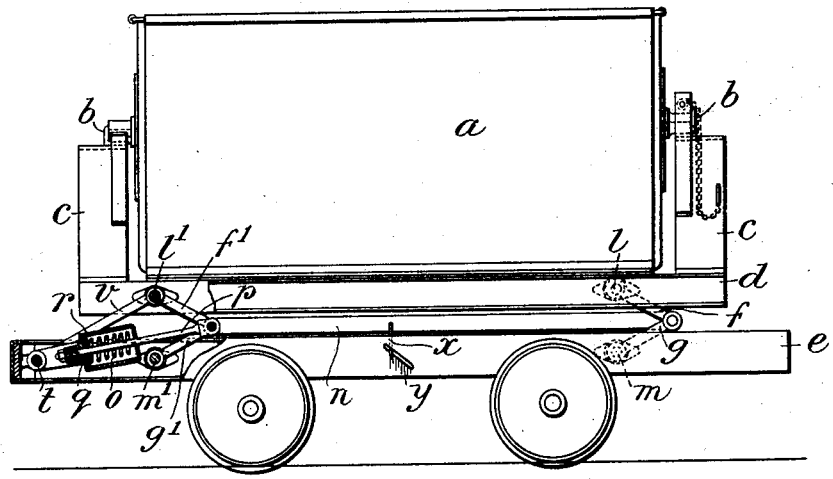
Figure 2:
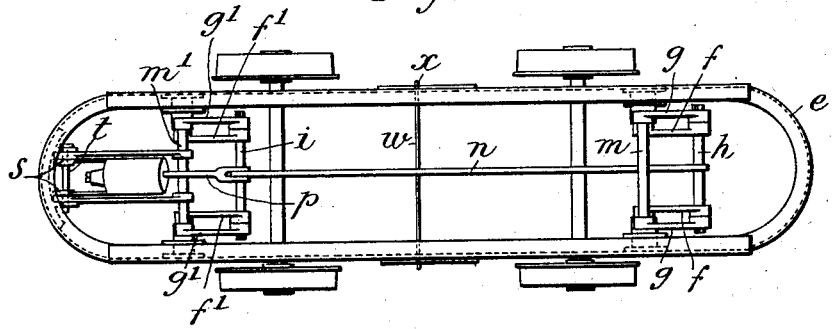
Figure 3:
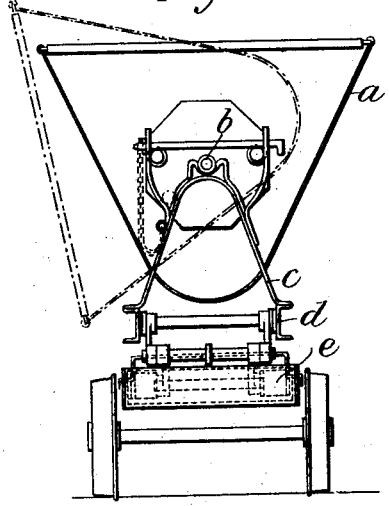
Figure 4:
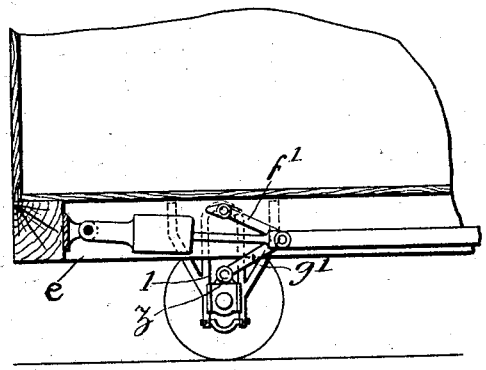

In the accompanying drawings, Figure 1 is a sectional elevation, Fig. 2 an inverted plan, and Fig. 3 an end elevation, of a tipping or dumping trolley fitted with springs and spring connections constructed according to this invention. Fig. 4 shows a vertical section of one end of an ordinary railway-truck.

Referring to Figs. 1, 2, and 3 of the drawings, the body $a$ of the tipping-wagon is mounted in bearings $b$, surmounting standards $c$, secured to the horizontal carrying-frame $d$, itself supported by the main frame $e$ through the toggle-levers $f$ $g$ $f'$ $g'$, pivoted together by the pivot-spindles $h$ $i$ and to the carrying-frame and main frame by the spindles $l$ $l'$ $m$ $m'$. The toggle-levers are all of equal length and their pivot-spindles $h$ $i$ are connected together by the connecting-rod $n$ and to a spring $o$ by a rod $p$, having an adjustable head $q$ free to slide in the spring-box $r$, which is connected to the main frame $e$ by the rod extensions $s$ and pin $t$. The spindle $i$ is also connected to the main frame by means of toggle-link $f'$, radial guide-rods $v$, and pin $t$. It will thus be seen that as the load in the body $a$ is varied the angle between the toggle-levers and the distance between frames $d$ $e$ are also correspondingly varied, the closing and opening of the toggle-levers causing an increased or diminished force to be communicated to the spring $o$. It will be obvious that any movement imparted to one pair of toggle-levers will be equally communicated to the remaining three pairs through the frames $d$ $e$, rod $n$, and radial guide-rods $v$, so that for any given load wherever placed in the body $a$ a corresponding force is communicated to the spring $o$, and by the unison of motion in the toggle-levers the planes of the frame $d$ in different positions are always parallel.

In order to ascertain the load in the vehicle, it is only necessary to affix to some convenient part of the moving mechanism a pointer or other indicator. For this purpose a rod $w$ is secured to the connecting-rod $n$ and has on its extremity pointers $x$, which with the imposition of varying loads traverse a suitably-graduated scale $y$, and thereby indicate the weight.

Fig. 4 shows this invention applied to an ordinary truck, the toggle-levers $f'$ $g'$ being connected to the frame $e$ and axle-box $z$. In this case the radial guide-rods are dispensed with, their place being supplied by the axle-box guides, as will be readily understood.

What I claim, and desire to secure by Letters Patent, is—

1. In a wheeled vehicle, the combination with the main frame $e$, of the horizontal carrying-frame $d$, the toggle-levers $f$, $g$, $f'$, $g'$, pivoted together by pivot-spindles, and to the carrying-frame and main frame by spindles $l$, $l'$, $m$, $m'$, said toggle-levers being all of equal length, the body $a$, mounted on frame $d$, a connecting-rod connecting the spindles $h$, $i$, a spring $o$, a rod connecting the spindles $h$, $i$, with the spring, a spring-box $r$ in which the rod can slide, a connection between the box and main frame, a connection between the spindle $i$, and main frame, a pointer carried by a movable part of the mechanism, and a scale over which said pointer can travel.

2. In a wheeled vehicle, the combination with the main frame $e$, of the horizontal carrying-frame $d$, the toggle-levers $f$, $g$, $f'$, $g'$, pivoted together by pivot-spindles $h$, $i$, and to the carrying-frame and main frame by spindles $l$, $m$, $l'$, $m'$, said toggle-levers being all of equal length, the body $a$, mounted in bearings surmounting standards $c$, secured to the frame $d$, a connecting-rod connecting the spindles $h$, $i$, a spring $o$, the rod $p$, connecting the spindles $h$, $i$, with the spring, said rod $p$, having an adjustable head, the box $r$, in which said head can slide, connections between said box and the main frame, the toggle-link, radial guide-rods and pin $t$, connecting the spindle $i$, to the main frame, a rod connected to the rod $n$, and carrying pointers, and a graduated scale $y$, over which said pointers can travel.

In testimony whereof I have affixed my signature in presence of two witnesses.

THOMAS GEORGE STEVENS.

Witnesses:
   W. G. GLASTER,
   W. J. SKERTEN.